(12) United States Patent
Takahashi

(10) Patent No.: US 6,901,193 B2
(45) Date of Patent: May 31, 2005

(54) DISPERSION COMPENSATING OPTICAL FIBER RIBBON AND OPTICAL TRANSMISSION SYSTEM USING THE SAME

(75) Inventor: Fumio Takahashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 63 days.

(21) Appl. No.: 10/195,107

(22) Filed: Jul. 15, 2002

(65) Prior Publication Data

US 2003/0026562 A1 Feb. 6, 2003

(30) Foreign Application Priority Data

Jul. 16, 2001 (JP) .......................................... 2001-214799

(51) Int. Cl.[7] .................................................. G02B 6/04
(52) U.S. Cl. ........................ 385/114; 385/123; 398/148
(58) Field of Search ................................ 385/114, 123; 398/148

(56) References Cited

U.S. PATENT DOCUMENTS

| 5,611,016 A | | 3/1997 | Fangmann et al. | |
|---|---|---|---|---|
| 5,838,867 A | * | 11/1998 | Onishi et al. | 385/123 |
| 5,905,838 A | * | 5/1999 | Judy et al. | 385/123 |
| 6,031,955 A | | 2/2000 | Mukasa et al. | |
| 6,052,505 A | * | 4/2000 | Bice et al. | 385/136 |
| 6,434,306 B1 | * | 8/2002 | Ishikawa et al. | 385/114 |
| 2002/0041745 A1 | * | 4/2002 | Lee et al. | 385/114 |

FOREIGN PATENT DOCUMENTS

| EP | 0 627 639 | 12/1994 |
|---|---|---|
| EP | 1 043 609 | 10/2000 |

* cited by examiner

Primary Examiner—Rodney Bovernick
Assistant Examiner—Sung Pak
(74) Attorney, Agent, or Firm—Oblon, Spivak, McClelland, Maier & Neustadt, P.C.

(57) ABSTRACT

A dispersion compensating optical fiber ribbon comprising a plurality of coated optical fibers arranged in a parallel planar array, wherein each of the optical fibers exhibits at a wavelength of 1550 nm, a dispersion value of −10 ps/nm/km or less, the dispersion slope of a negative value, and the transmission loss of not more than 1 dB/km.

8 Claims, 2 Drawing Sheets

DISPERSION COMPENSATING OPTICAL FIBER RIBBON AND OPTICAL TRANSMISSION SYSTEM USING THE SAME

FIELD

The present invention relates to a dispersion compensating optical fiber ribbon, in which a plurality of coated optical fibers are arranged in a parallel planar array and covered with a resin. Further, the present invention relates to an optical fiber module using such an optical fiber ribbon.

BACKGROUND

Recently, a technique to increase transmission capacity in optical transmission is being actively studied. In particular, regarding optical transmission systems (metropolitan type systems) in urban areas, the number of fibers in an optical fiber cable tends to increase more and more. Recently, an optical fiber cable of approximately 1000 fibers has been put into practical use.

To improve workability in splicing and/or connecting, optical fiber ribbons are generally adopted for such an optical fiber cable. In an optical fiber ribbon, a plurality of coated optical fibers are arranged in a parallel planar array and integrated by a resin. At present, optical fiber ribbons of 4, 8, 12, 24 fibers, and the like are in practical use.

Further, coated optical fibers used for an optical fiber ribbon can be obtained by coating an optical fiber having a diameter of approximately 125 $\mu$m with an ultraviolet curing resin to have a diameter of approximately 250 $\mu$m. The optical fiber is usually a single mode optical fiber (SMF) having zero dispersion at a wavelength around 1300 nm.

On the other hand, as a technique to increase transmission capacity in optical transmission, wavelength division multiplexing optical transmission system (WDM system) is actively studied, particularly for long distance transmission systems. Employment of the WDM system also comes to be considered for metropolitan type systems of relatively short distances.

Generally, to perform WDM optical transmission, it is necessary that a waveform distortion that can hardly be reshaped does not occur. For that purpose, it is deemed effective to suppress nonlinear phenomenon in an optical transmission line. While the optical transmission line locally requires appropriate dispersion, it is necessary to minimize dispersion for the optical transmission line as a whole. Further, any dispersion difference between the wavelengths for optical signals causes a difference in waveform distortion amount for each wavelength, so that it is necessary to make the dispersion slope in the optical transmission line small.

To satisfy these requirements, when performing WDM optical transmission, there is adopted in many cases an optical transmission system wherein the dispersion is controlled by employing an optical fiber with positive dispersion (hereinafter referred to as a positive dispersion optical fiber) and an optical fiber with negative dispersion (hereinafter referred to as a negative dispersion optical fiber) in combination. In particular, such an optical transmission system is widely adopted for long distance transmission systems.

In a metropolitan type WDM system for a relatively short distance, the required characteristics are not so strict compared to the case for a long distance transmission system. For example, in a metropolitan type WDM system, the maximum transmission speed is approximately 10 Gbps at most, and the maximum transmission distance is approximately 40 km, so that an optical amplifier is not required different from the case for a long haul transmission system.

Generally, in dense wavelength division multiplexing (DWDM) optical transmission of a transmission speed of 10 Gbps, the permissible maximum cumulative dispersion (dispersion proof-stress) of the optical transmission system is approximately 500 ps/nm, which is relatively large. Thus, what is required is an inexpensive and simple optical transmission system, rather than a system with strictly controlled dispersion characteristics.

When an optical transmission line using an SMF is adopted in a metropolitan type WDM optical transmission system, the dispersion value of an SMF is approximately 17 ps/nm/km at a wavelength of 1550 nm. Thus, in the case of a transmission distance of 40 km, the cumulative dispersion of the optical transmission line becomes approximately 680 ps/nm, which exceeds the dispersion proof-stress (500 ps/nm) of the system, resulting in a deterioration of a transmission quality. Thus, it becomes necessary to control the dispersion characteristics by using a negative dispersion optical fiber, such that the cumulative dispersion of the optical transmission system does not exceed the dispersion proof-stress. A dispersion compensating optical fiber (DCF) is generally used as a negative dispersion optical fiber for controlling the dispersion characteristics of an optical transmission line formed by SMF.

However, in a conventional DCF module, each DCF is accommodated in a module, and connectors are attached to both ends of the DCF, to allow each DCF being connected to an optical fiber such as SMF of an optical transmission line. Thus, connecting a module for each DCF of an optical fiber cable with numerous fibers (with e.g., 1000 fibers) results in the accommodation space becoming rather bulky. Further, the connecting operation takes much time with the result that the cost of the optical transmission system becomes high.

SUMMARY

The present invention is a dispersion compensating optical fiber ribbon, in which a plurality of coated optical fibers are arranged in a parallel planar array and covered with a resin, wherein each of the optical fibers exhibits a dispersion value of −10 ps/nm/km or less, the dispersion slope of a negative value, and the transmission loss of not more than 1 dB/km, at a wavelength of 1550 nm.

Further, the present invention is an optical fiber module having a dispersion compensating optical fiber ribbon wound like a coil so as to form the module.

Other and further features, and advantages of the invention will appear more fully from the following description, taken in connection with the accompanying drawings.

DETAILED DESCRIPTION

According to the present invention, there is provided the following means:

(1) A dispersion compensating optical fiber ribbon, comprising a plurality of coated optical fibers that are arranged in a parallel planar array and covered with a resin, wherein each of the optical fibers exhibits, at a wavelength of 1550 nm, a dispersion value of −10 ps/nm/km or less, the dispersion slope of a negative value, and the transmission loss of not more than 1 dB/km.

(2) The dispersion compensating optical fiber ribbon according to the above item (1), wherein each optical fiber in the optical fiber ribbon has a fiber-curl having a radius of curvature of not less than 8 m.

(3) The dispersion compensating optical fiber ribbon according to item (1), wherein, at a wavelength of 1550 nm, the maximum value of DPSs, which are obtained by dividing the dispersion value of said each dispersion compensating optical fiber by the dispersion slope of the same fiber, is not more than 200% of the minimum value of the DPSs.

(4) An optical fiber module wherein a dispersion compensating optical fiber ribbon according to the above item (1) is wound like a coil so as to form the module.

By using an optical fiber ribbon according to the items (1) through (3) of the present invention, it is possible to control, at low cost, dispersion characteristics so that the cumulative dispersion of an optical transmission system is not more than the dispersion proof-stress.

According to the item (4) of the present invention, it is possible to realize in a small size and at low cost an optical fiber module for controlling dispersion characteristics so that the cumulative dispersion of an optical transmission system is not more than the dispersion proof-stress.

Herein, the fiber-curl of the optical fiber means a curl that is measured by the measurement method as shown in IEC 60793-1-B8A, and means a curl of an optical fiber in a free state with the collective coating of the optical fiber ribbon removed.

Embodiments of the present invention will now be described with reference to the drawings.

Figure 1:
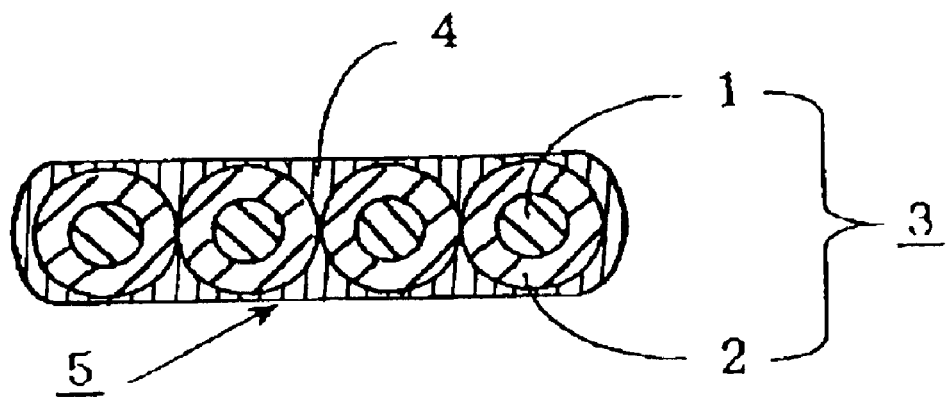
FIG. 1 is a sectional view showing an example of an optical fiber ribbon according to the present invention.

FIG. 1 is a sectional view showing an optical fiber ribbon according to an embodiment of the present invention. In FIG. 1, numeral 1 indicates an optical fiber, numeral 2 indicates an individual coating, numeral 3 indicates an coated optical fiber, numeral 4 indicates a collective coating, and numeral 5 indicates an optical fiber ribbon. In the example shown, the optical fiber ribbon 5 comprises four fibers.

Figure 2:
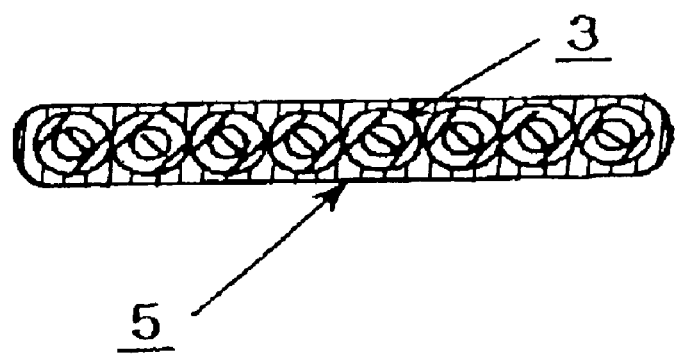
FIG. 2 is a sectional view showing another example of an optical fiber ribbon according to the present invention.

FIG. 2 is a sectional view showing an optical fiber ribbon according to another embodiment of the present invention. In FIG. 2, the components identical to those of FIG. 1 are indicated by the same reference numerals, and a description of such components will be omitted. In the example shown, the optical fiber ribbon 5 comprises eight fibers.

It goes without saying that by arranging a plurality of coated optical fibers 3 in a parallel planar array and integrating them by collective coating 4, as shown in FIGS. 1 and 2, it is possible to obtain an optical fiber ribbon 5 having, for example, twelve or twenty-four fibers.

The optical fibers 1 and the coated optical fibers 3 used in the optical fiber ribbons 5 shown in FIGS. 1 and 2 have the following features.

Each of the optical fibers 1 exhibit at a wavelength of 1550 nm a dispersion value of not more than −10 ps/nm/km, a negative dispersion slope value, and a transmission loss of not more than 1 dB/km. While the standard diameter of the optical fibers 1 is approximately 125 µm, it may range from approximately 80 µm to approximately 125 µm according to uses.

The optical fibers 1 are optical fibers for compensating the dispersion characteristics of SMF (Single-Mode Fiber), DSF (Dispersion-Shifted Fiber) or NZDSF (Non-zero Dispersion-Shifted Fiber).

The coated optical fibers 3 are obtained by preparing the optical fibers 1 having the above features with individual coating 2. More specifically, individual coating 2 of an ultraviolet curing resin is applied to the optical fibers 1 whose diameter ranges from approximately 80 µm to approximately 125 µm, so as to attain coated optical fibers having a diameter of approximately 160 µm to approximately 250 µm.

Then, by using the coated optical fibers 3 having the above features, the optical fiber ribbon 5 is formed, and, by using the optical fiber ribbon 5, it is possible to achieve a reduction in the size of an optical fiber module for dispersion compensation to reduce the accommodation space. Further, it is possible to collectively splice with an optical fiber ribbon constituting an optical transmission line by using a commercially available mass-fusion splicer, making it possible to compensate the dispersion of an optical transmission system at low cost.

It is preferable for the optical fibers 1 to have a mode field diameter (MFD) of 3 to 7 µm at a wavelength of 1550 nm, and have a polarization mode dispersion (PMD) of 1 ps·km$^{-1/2}$ or less at the same wavelength.

When the MFD is less than 3 µm, non-linearity phenomenon is likely to occur inside the optical fibers 1. On the other hand, when the MFD is more than 7 µm, the bending loss is likely to increase. When the PMD is larger than 1 ps·km$^{-1/2}$, it is not preferable since the PMD cannot be permitted even in a metropolitan type optical transmission system.

It is also preferable for the optical fiber ribbon 5 to satisfy that each optical fiber 1 in the optical fiber ribbon 5 has a fiber-curl whose radius of curvature be not less than 8 m. Because the optical fibers according to the present invention have MFD of approximately 3 to 7 µm, which is less than that of the conventional SMFS, or the like. Therefore, the fiber-curl should be more strict than that of the conventional optical fibers such as SMFs or DSFs, from the viewpoint of restraining the increase in the splice loss in the connection with the optical transmission line.

Here, the fiber-curl of the optical fiber 1 is defined in accordance with IEC 60793-1-B8A, and is closely related to the splice loss at the time of mass-fusion splicing.

It is also preferable for the optical fiber ribbon 5 that the maximum values of the DPSs of all the optical fibers 1 in the optical fiber ribbon 5 at a wavelength of 1550 nm be not more than 200% of the minimum value of the same, to perform at low cost the dispersion compensation such that the cumulative dispersion of the optical transmission line system is not more than the dispersion proof-stress.

It is preferable for the optical fiber ribbon 5 that the DPSs of the individual optical fibers 1 in the optical fiber ribbon 5 at a wavelength of 1550 nm be not less than 75% and not more than 150% of the average DPS value of the optical fibers of the optical transmission line to be connected to the optical fiber ribbon 5.

In the case of standard single-mode fibers, the DPS is approximately 300 nm at a wavelength of 1550 nm. When using the optical fiber ribbon 5 of the present invention to compensate the dispersion of such a standard SMF, the DPS of the individual optical fibers 1 included therein at a wavelength of 1550 nm is set in a range, for example, of approximately 225 nm to 450 nm. The range of the preferable value of DPS depends upon the average DPS value of the optical fibers of the optical transmission line to be connected to the optical fiber ribbon 5.

It is also preferable for the optical fiber ribbon that the dispersion value of the individual optical fibers 1 in the optical fiber ribbon 5 at a wavelength of 1550 nm be within a range of the average dispersion value of the all optical fibers in the ribbon and ±25% thereof.

Furthermore it is preferable for the optical fiber ribbon that can be divided into the individual coated optical fibers 3. This allows to joint with another optical transmission line with single-fiber connectors.

Next, an application example of the optical fiber ribbon 5 according to the present invention, is illustrated.

Figure 3:
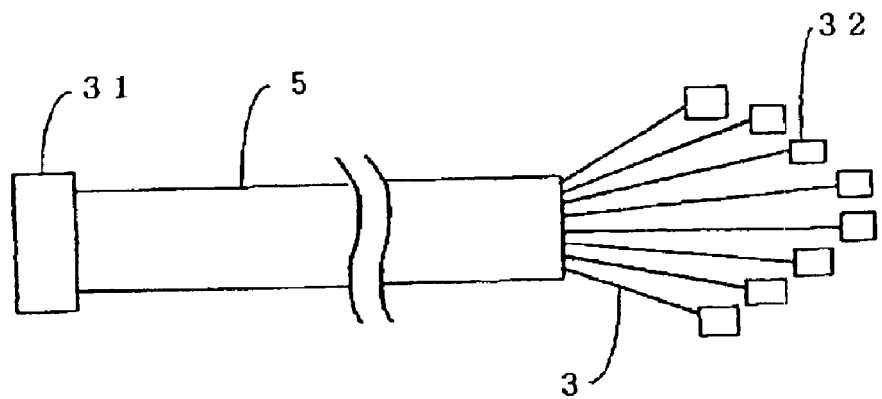
FIG. 3 is a schematic explanatory diagram showing an example of how the optical fiber ribbon of the present invention is used.

In FIG. 3, a multi-fiber connector 31 is attached to one end of the optical fiber ribbon 5, and singe-fiber connectors 32 are attached to the other end of the ribbon.

This embodiment is not restricted to the one shown in FIG. 3. Multi-fiber connectors may be attached to both ends of the optical fiber ribbon 5, single-fiber connectors may be attached to both ends of the optical fiber ribbon 5, single-fiber connectors may be attached to one end of the optical fiber ribbon 5, with the other end being spliced to an optical transmission line; and the like.

Figure 4:
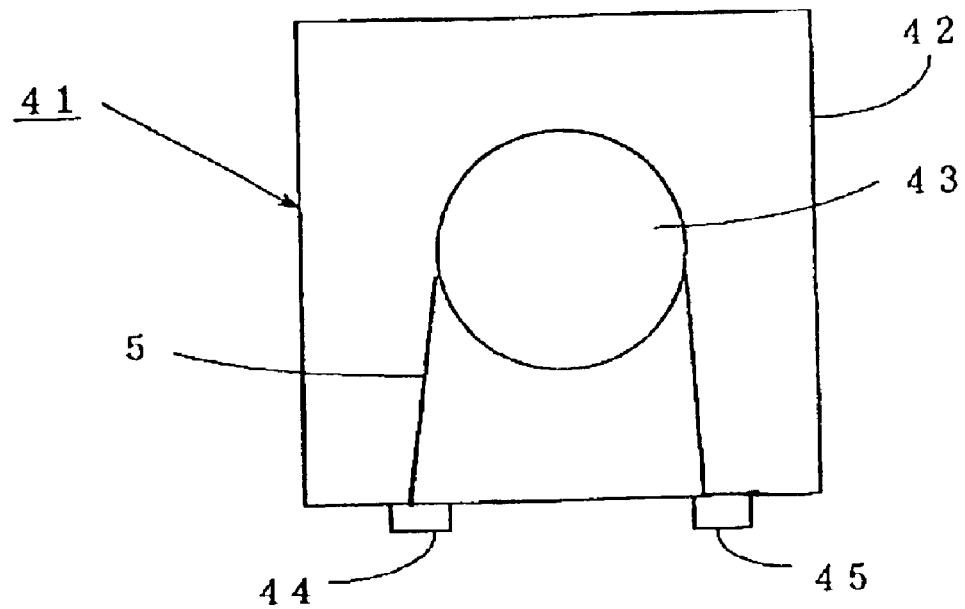
FIG. 4 is a schematic explanatory diagram showing an example of an optical fiber module in which an optical fiber ribbon according to the present invention is accommodated.

FIG. 4 is an explanatory diagram showing an example of an optical fiber module to which the optical fiber ribbon 5 of this embodiment is accommodated. The optical fiber module 41 includes a housing 42, in which a reel 43, a first interface 44, and a second interface 45 are provided. The reel 43 may be replaced by some other means.

It is also possible to form the optical fiber module 41 such that the optical fiber ribbon 5 with a connector as shown in FIG. 3 is wound around the reel 43, with the multi-fiber connector 31 and the single-fiber connectors 32 attached to the terminals of the optical fiber ribbon 5. The optical transmission system shown in FIG. 5 is suitable for a metropolitan type optical transmission system; an optical signal sent out from a transmitting station 52, which includes an optical transmission unit 51, is transmitted through an optical transmission line 53 and received by a receiving station 55 including an optical reception unit 54.

A plurality of optical transmitters may be arranged for transmitting WDM optical signals.

Figure 5:
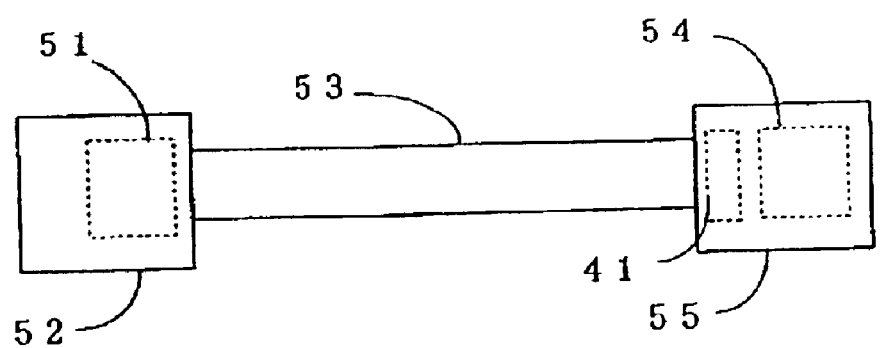
FIG. 5 is a schematic explanatory diagram showing an example of an optical transmission system using an optical fiber ribbon according to the present invention.

Further, when a single optical fiber module 41 having the above-described optical fiber ribbon 5 is provided directly before the optical reception unit 54 in the receiving station 55 shown in FIG. 5, a reduction in accommodation space and in connecting operation time can be achieved, as compared to the conventional structure in which optical fiber modules are used in the same number as the optical receivers, and it is possible to control the dispersion characteristics at low cost.

The optical fiber ribbon 5 according to the invention may be incorporated within an optical fiber cable, as a part of the optical transmission line 53 of the optical transmission system shown in FIG. 5.

As described above, by using the optical fiber ribbon of the present invention and the optical fiber module with the optical fiber ribbon, it is advantageously possible to compensate, at low cost, the dispersion so that the cumulative dispersion of an optical transmission system is not more than the dispersion proof-stress.

The present invention will be described in more detail, but the present invention is not meant to be limited by these examples.

EXAMPLES

The measurement was performed on examples of the construction of the optical fiber ribbon of the present invention and comparative examples, for multi-fiber fusion splice loss with identical ribbons. The results are shown in Table 1.

The results were evaluated as "good" (O) in the case of not more than 0.2 dB, and as "bad" (x) in the case of more than 0.2 dB.

Wherein, the outer diameter of the optical fibers was approximately 125 $\mu$m, the outer diameter of the coated optical fibers was approximately 250 $\mu$m, the thickness of the optical fiber ribbons was in a range of 300 $\mu$m ±50 $\mu$m, and the width of the optical fiber ribbons was a value obtained by adding approximately 100 $\mu$m to the product of the outer diameter of the coated optical fiber and the number of fibers.

The characteristics of the optical fibers used were as follows: the dispersion value at a wavelength of 1550 nm was not more than −10 ps/nm/km; the dispersion slope at the wavelength was negative; and the transmission loss at the wavelength was not more than 1 dB/km.

In Table 1, the unit for MFD was in $\mu$m, and the unit for the minimum radius of curvature of the fiber-curl of the optical fiber 1 contained in the optical fiber ribbon 5 was in meter.

TABLE 1

|  | Number of fibers | MFD | Minimum radius of curvature | Splice loss |
| --- | --- | --- | --- | --- |
| Example 1 | 4 | 4 | 8 | o |
| Example 2 | 8 | 6 | 8 | o |
| Example 3 | 12 | 5 | 8 | o |
| Example 4 | 24 | 5 | 10 | o |
| Comparative example 1 | 4 | 4 | 7 | x |
| Comparative example 2 | 8 | 7 | 4 | x |

As can be seen from Table 1, in each of the optical fiber ribbons of Examples 1 through 4, the minimum value of the radius of curvature of the curl was not less than 8 m, and the splice loss was small. In contrast, in each of the optical fiber ribbons of Comparative Examples 1 and 2, the minimum value of the radius of curvature of the curl was less than 8 m, and the splice loss was large.

Next, the optical fiber ribbons of Examples 1 through 4 of Table 1 were incorporated to prepare optical fiber modules 41 as shown in FIG. 4, and the n optical transmission systems as shown in FIG. 5 were prepared by incorporating these optical fiber modules 41.

In each of these optical transmission systems, the permissible maximum cumulative dispersion (dispersion proof-stress) when performing optical transmission at a speed of 10 Gbps was set to approximately 500 ps/nm.

When the distance between the transmitting station 52 and the receiving station 55 is approximately 40 km, and a conventional SMF (exhibiting a dispersion value of approximately 17 ps/nm/km at a wavelength of 1550 nm and a DPS of approximately 300) is used for the optical transmission line 53, the cumulative dispersion becomes approximately 680 ps/nm. Thus, an optical fiber module 41 with an average dispersion of approximately 300 ps/nm was prepared, so as to adjust the cumulative dispersion directly before the optical reception unit 54 to be approximately 380 ps/nm.

The length of the optical fiber ribbon used in the optical fiber module 41 was approximately 3 km, and the characteristics of the optical fibers contained in the optical fiber ribbon were as follows: the dispersion value was in a range of −95 to −105 ps/nm/km; the DPS was in a range of 270 to 360 nm; the transmission loss was approximately 0.4 dB/km; and the PMD was in a range of approximately 0.3 to 0.7 ps·km$^{-1/2}$.

In the case of the 4-fiber ribbon 5 of Example 1, the dimension of the optical fiber module 41 was 250 mm×250 mm×60 mm. While, the dimension of a conventional optical fiber module using a single-fiber optical fiber 1 was 200 mm×230 mm×60 mm.

That is, when the optical fiber module 41 using the 4-fiber ribbon of Example 1 is applied to the optical transmission system of FIG. 5, the space is reduced by approximately 35%, as compared to four optical fiber modules of a conventional single fiber. Further, the connecting operation is facilitated, so that it is possible to control the dispersion characteristics of an optical transmission line system at lower cost, as compared to the case of a conventional optical transmission system.

Application of the optical fiber modules 41 using the optical fiber ribbons (8 to 24 fibers) of Examples 2 through 4 shown in Table 1, to the optical transmission system of FIG. 5, makes it possible to achieve a further reduction in installation space.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An optical transmission system comprising:
    a plurality of transmission optical fibers having a positive dispersion, and
    a plurality of dispersion compensating optical fibers arranged in a parallel array, wherein
    said dispersion compensating optical fibers not including a fiber bragg grating and having the following characteristics at a wavelength of 1550 nm:
        a dispersion of −10 ps/nm/km or less,
        a dispersion slope of negative, and
        a transmission loss of 1 dB/km or less.

2. The optical transmission system of claim 1, wherein the maximum length of the transmission optical fiber is approximately 40 km.

3. The optical transmission system of claim 1, wherein the maximum transmission speed is approximately 10 Gbps.

4. A dispersion compensating optical fiber ribbon comprising:
    a plurality of dispersion compensating optical fibers arranged in a parallel array,
    said dispersion compensating optical fibers not including a fiber bragg grating and having the following characteristics at a wavelength of 1550 nm:
        a dispersion of −10 ps/nm/km or less,
        a dispersion slope of negative, and
        a transmission loss of 1 dB/km or less.

5. The dispersion compensating optical fiber ribbon of claim 4, wherein each of the plurality of said dispersion compensating optical fibers has a fiber-curl having a radius of curvature of not less than 8 m.

6. The dispersion compensating optical fiber ribbon of claim 4, wherein each of the plurality of said dispersion compensating optical fibers has, at a wavelength of 1550 nm, a mode field diameter (MFD) of 3 to 7 μm and a polarization mode dispersion (PMD) of 1 ps/√km or less.

7. A dispersion compensating optical fiber ribbon comprising a plurality of dispersion compensating optical fibers arranged in a parallel planar array, and each of a plurality of said dispersion compensating optical fibers has the following characteristics at a wavelength of 1550 nm:
    a dispersion of −10 ps/nm/km or less,
    a dispersion slope of negative, and
    a transmission loss of 1 dB/km or less,
    a fiber-curl having a radius of curvature of not less than 8 m.

8. The dispersion compensating optical fiber ribbon of claim 7, wherein each of the plurality of said dispersion compensating optical fibers has, at a wavelength of 1550 nm, a mode field diameter (MFD) of 3 to 7 μm and a polarization mode dispersion (PMD) of 1 ps/√km or less.

* * * * *